United States Patent
Kawagoe et al.

(10) Patent No.: US 9,416,054 B2
(45) Date of Patent: Aug. 16, 2016

(54) ALKYL-MODIFIED VINYL ACETAL POLYMER, AND COMPOSITION

(75) Inventors: Masako Kawagoe, Kurashiki (JP); Shinsuke Nii, Tainai (JP)

(73) Assignee: KURARAY CO., LTD., Kurashiki-shi (JP)

( * ) Notice: Subject to any disclaimer, the term of this patent is extended or adjusted under 35 U.S.C. 154(b) by 307 days.

(21) Appl. No.: 14/008,255

(22) PCT Filed: Mar. 26, 2012

(86) PCT No.: PCT/JP2012/057836
§ 371 (c)(1),
(2), (4) Date: Sep. 27, 2013

(87) PCT Pub. No.: WO2012/133351
PCT Pub. Date: Oct. 4, 2012

(65) Prior Publication Data
US 2014/0018488 A1    Jan. 16, 2014

(30) Foreign Application Priority Data
Mar. 28, 2011    (JP) .................................. 2011-069515

(51) Int. Cl.
| | |
|---|---|
| *C04B 35/10* | (2006.01) |
| *C08F 8/00* | (2006.01) |
| *C08G 63/91* | (2006.01) |
| *C08K 3/18* | (2006.01) |
| *H01G 4/12* | (2006.01) |
| *C08F 216/38* | (2006.01) |
| *C08F 216/06* | (2006.01) |
| *C08F 218/08* | (2006.01) |

(52) U.S. Cl.
CPC ................ *C04B 35/10* (2013.01); *C08F 216/38* (2013.01); *H01G 4/12* (2013.01); *C08F 216/06* (2013.01); *C08F 218/08* (2013.01)

(58) Field of Classification Search
CPC ........... H01G 4/12; C08F 216/38; C08F 8/28; C08F 8/12; C08F 218/08; C08F 220/54; C08F 216/06; C04B 35/10
See application file for complete search history.

(56) References Cited

U.S. PATENT DOCUMENTS

| | | | | |
|---|---|---|---|---|
| 7,632,369 | B2 * | 12/2009 | Sato | ..................... C04B 35/4682 156/89.11 |
| 2004/0260020 | A1 | 12/2004 | Miyake et al. | |
| 2009/0093609 | A1 | 4/2009 | Shibutani et al. | |
| 2011/0049434 | A1 * | 3/2011 | Ootsuki | .................. C04B 35/04 252/500 |

FOREIGN PATENT DOCUMENTS

| | | | |
|---|---|---|---|
| CN | 1315225 C | 5/2007 | |
| CN | 101426821 A | 5/2009 | |
| EP | 2 006 308 A1 | 12/2008 | |
| JP | 06-263521 A | 9/1994 | |
| JP | 8-113608 A | 5/1996 | |
| JP | 08113608 | * 5/1996 | ............... C08F 8/28 |
| JP | 2002-244242 A | 8/2002 | |
| JP | 2003-183325 A | 7/2003 | |
| JP | 2006-104309 A | 4/2006 | |
| JP | 2008-504415 A | 2/2008 | |
| JP | 2008-280480 A | 11/2008 | |
| JP | 2009-088410 A | 4/2009 | |

OTHER PUBLICATIONS

Extended European Search Report issued Aug. 21, 2014 in Patent Application No. 12763557.1.
International Search Report issued Jun. 19, 2012 in PCT/JP2012/057836.

* cited by examiner

*Primary Examiner* — Alexa Neckel
*Assistant Examiner* — Marie Reddick
(74) *Attorney, Agent, or Firm* — Oblon, McClelland, Maier & Neustadt, L.L.P.

(57) ABSTRACT

Provided are a vinyl acetal polymer that has sufficient plasticity and solubility in an alcohol solvent, imparts low viscosity, stability, etc., to a solution thereof, is less likely to cause phase separation from other components, and allows for formation of a slurry superior in dispersibility of particles and thixotropic nature, as well as a sheet superior in strength and flexibility, and the like. An alkyl-modified vinyl acetal polymer obtained by subjecting an alkyl-modified vinyl alcohol polymer to acetalization, in which the alkyl-modified vinyl alcohol polymer comprises a monomer unit represented by the following general formula (I), and has a viscosity average degree of polymerization P of 150 or greater and 5,000 or less, a degree of saponification of 20 mol % or greater and 99.99 mol % or less, and a percentage of alkyl modification S with the monomer unit of 0.05 mol % or greater and 5 mol % or less.

(I)

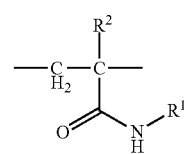

14 Claims, No Drawings

ALKYL-MODIFIED VINYL ACETAL POLYMER, AND COMPOSITION

CROSS REFERENCE TO RELATED APPLICATIONS

The present application is a 35 U.S.C. §371 national stage patent application of International patent application PCT/JP2012/057836, filed on Mar. 26, 2012, published as WO/2012/133351 on Oct. 4, 2012, the text of which is incorporated by reference, and claims the benefit of the filing date of Japanese application no. 2011-069515, filed on Mar. 28, 2011, the text of which is also incorporated by reference.

TECHNICAL FIELD

The present invention relates to an alkyl-modified vinyl acetal polymer that is superior in plasticity, a composition comprising the same, and a ceramic green sheet and a laminated ceramic capacitor obtained using the composition.

BACKGROUND ART

Vinyl acetal polymers typified by vinyl butyral polymers are superior in toughness, film-forming property, dispersibility of inorganic and/or organic powders, etc., added, adhesiveness to a coated surface, and the like. Therefore, the vinyl acetal polymer has been used in a variety of intended usage such as intermediate films of laminated glasses, inks, paints, enamels for stoving, wash primers, lacquers, dispersants, adhesives, ceramic green sheets, thermally developable photosensitive materials, binders for aqueous ink-receiving layers, and the like. The principal reason for such use of the vinyl acetal polymer in the variety of intended usage is that the vinyl acetal polymer has superior toughness; however, to the contrary, the vinyl acetal polymer is accompanied by a disadvantage of inferior flexibility. Also, due to a high glass transition temperature, the vinyl acetal polymer is accompanied by a disadvantage of an inferior flow performance even under conditions of comparatively high temperatures.

In order to subject such a vinyl acetal polymer to a thermoplastic forming, it is necessary to add a plasticizer such as, e.g., a phthalic acid ester of an alcohol having 6 to 10 carbon atoms, triethylene glycol di(n-heptanoate), tri(2-ethylhexyl) phosphate, tricresyl phosphate or the like. However, compositions containing the vinyl acetal polymer and the plasticizer are likely to cause phase separation unless the plasticizer is appropriately selected, and is thus accompanied by a disadvantage of elution of the plasticizer into a solvent, leading to a remarkable change in properties of the composition. Therefore, films, sheets and the like obtained from the composition have unsatisfactory coating film strength, transparency, storage stability and the like, and an ink may leak out when printing is carried out on the surface thereof.

Accordingly, in order to prevent deterioration, etc., of various types of physical properties resulting from the addition of such a plasticizer, an attempt of internally plasticizing a vinyl acetal polymer has been conducted. For example, modified vinyl acetal polymers obtained by modifying a side chain of a vinyl alcohol polymer (hereinafter, may be also referred to as PVA) with polyalkylene oxide or the like and thereafter subjecting to acetalization have been known to be internally plasticized by a polyalkylene oxide structure of the side chain, whereby the flexibility is improved (see Japanese Unexamined Patent Application, Publication No. H06-263521). However, unreacted polyalkylene oxide remains in the resin according to this method; therefore, when films, sheets and the like are formed from the modified vinyl acetal polymer, they may get clouded. In addition, in a case in which the modified vinyl acetal polymer is used as a ceramic binder, there exist disadvantages such as: dispersibility of the ceramic powder in the modified vinyl acetal polymer being insufficient; phase separation of unreacted polyalkylene oxide during drying to remove the solvent for producing a green sheet, etc., thereby leading to a difficulty in obtaining a ceramic having high density; flexibility of the resultant green sheet or the like being insufficient; and the like. Furthermore, since the modified vinyl acetal polymer is inferior in storage stability, there also exists a disadvantage of time dependent elevation of the viscosity.

In addition, a vinyl acetal polymer produced by acetalizing PVA containing 1 to 20 mol % of ethylene at random, as a constitutional unit of the main chain has been proposed in Japanese Unexamined Patent Application, Publication No. 2003-183325. By introducing ethylene into the main chain in this manner, flexibility of the vinyl acetal polymer is improved, and the solution viscosity and the viscosity stability can be improved. However, since this vinyl acetal polymer is insufficient in solubility in a solvent of a sole alcohol, there exists a disadvantage of failure in meeting environmental concerns in recent years, i.e., the trend to a shift from use of mixed solvents containing an aromatic solvent such as toluene as a principal solvent to use of an alcohol solvent.

Furthermore, Japanese Unexamined Patent Application, Publication No. 2006-104309 discloses a polymer produced by acetalizing PVA including a 1,2-diol component in a side chain, as a vinyl acetal polymer accompanied by improved flexibility, lowering of the viscosity, etc., and also favorable viscosity stability. However, when films, sheets and the like are formed from this vinyl acetal polymer, a disadvantage of their coating film strength being insufficient may occur.

On the other hand, Japanese Unexamined Patent Application (Translation of PCT Application), Publication No. 2008-504415 discloses, as a vinyl acetal polymer that is superior in plasticity, a vinyl acetal polymer formed by acetalizing PVA including a unit derived from a tertiary vinyl ester of an α-branched monocarboxylic acid having 9 to 15 carbon atoms. However, when the vinyl acetal polymer is used in a slurry composition for a ceramic green sheet, the vinyl acetal polymer has a disadvantage, for example, that handleability in printing, coating, or the like is inferior due to dispersibility in an inorganic dispersion medium being inferior, and thixotropic nature of the composition being insufficient, or the like.

PRIOR ART DOCUMENTS

Patent Documents

Patent Document 1: Japanese Unexamined Patent Application, Publication No. H06-263521
Patent Document 2: Japanese Unexamined Patent Application, Publication No. 2003-183325
Patent Document 3: Japanese Unexamined Patent Application, Publication No. 2006-104309
Patent Document 4: Japanese Unexamined Patent Application (Translation of PCT Application), Publication No. 2008-504415

SUMMARY OF THE INVENTION

Problems to be Solved by the Invention

The present invention was made in view of the foregoing circumstances, and an object of the invention is to provide a vinyl acetal polymer that has sufficient plasticity and solubility in an alcohol solvent, imparts low viscosity and stability to a solution thereof, is less likely to cause phase separation from other components, and allows for formation of a slurry superior in dispersibility of particles and thixotropic nature, as well as a sheet superior in strength and flexibility, and the like. In addition, another object of the invention is to provide a composition comprising the vinyl acetal polymer, a ceramic green sheet obtained using the composition, and a laminated ceramic capacitor obtained using the ceramic green sheet.

Means for Solving the Problems

An aspect of the present invention made for solving the problems described above relates to an alkyl-modified vinyl acetal polymer obtained by subjecting an alkyl-modified vinyl alcohol polymer to acetalization, the alkyl-modified vinyl alcohol polymer comprising a monomer unit represented by the following general formula (I), and the alkyl-modified vinyl alcohol polymer having a viscosity average degree of polymerization P of 150 or greater and 5,000 or less, a degree of saponification of 20 mol % or greater and 99.99 mol % or less, and a percentage of alkyl modification S with the monomer unit of 0.05 mol % or greater and 5 mol % or less.

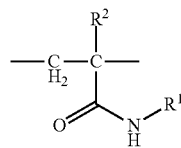

(I)

In the formula, $R^1$ represents a linear or branched alkyl group having 8 to 29 carbon atoms; and $R^2$ represents a hydrogen atom or an alkyl group having 1 to 8 carbon atoms.

The alkyl-modified vinyl acetal polymer having the characteristic features described above has a low glass transition point, superior plasticity, and high solubility in an alcohol solvent, gives low solution viscosity, and also leads to superior stability over time of the solution viscosity. Moreover, when the alkyl-modified vinyl acetal polymer is incorporated into a composition, the alkyl-modified vinyl acetal polymer is less likely to cause phase separation from other component, and exhibits superior dispersibility of inorganic particles such as a ceramic powder. In particular, when the alkyl-modified vinyl acetal polymer is incorporated into a composition such as paints in slurry form, it can impart a thixotropic nature to the composition. Furthermore, films, sheets, and the like obtained by forming the alkyl-modified vinyl acetal polymer have high strength and flexibility.

The alkyl-modified vinyl acetal polymer according to the aspect of the present invention preferably has a degree of acetalization of 1 mol % or greater and 85 mol % or less. When the degree of acetalization falls within the above defined range, the alkyl-modified vinyl acetal polymer leads to sufficiently superior dispersibility of inorganic particles and the like, and additionally satisfies strength and flexibility required for films, sheets and the like obtained by forming the alkyl-modified vinyl acetal polymer. Herein, the degree of acetalization as referred to means a proportion of acetalized vinyl alcohol units with respect to all the monomer units constituting the alkyl-modified vinyl acetal polymer, and may be calculated from a proton NMR spectrum obtained by carrying out a proton NMR measurement on a solution of the alkyl-modified vinyl acetal polymer in DMSO-$d_6$ (dimethyl sulfoxide) as a sample.

The aspect of the present invention also relates to an alkyl-modified vinyl acetal polymer, comprising a monomer unit represented by the following general formula (I), and having a viscosity average degree of polymerization P of 150 or greater and 5,000 or less, a degree of acetalization of 1 mol % or greater and 85 mol % or less, and a percentage of alkyl modification S with the monomer unit of 0.05 mol % or greater and 5 mol % or less.

(I)

In the formula, $R^1$ represents a linear or branched alkyl group having 8 to 29 carbon atoms; and $R^2$ represents a hydrogen atom or an alkyl group having 1 to 8 carbon atoms.

The alkyl-modified vinyl acetal polymer having the characteristic features described above has a low glass transition point, superior plasticity and high solubility in an alcohol solvent, gives low solution viscosity, and also leads to superior stability over time of the solution viscosity. Moreover, when the alkyl-modified vinyl acetal polymer is incorporated into a composition, the alkyl-modified vinyl acetal polymer is less likely to cause phase separation from other component, and exhibits superior dispersibility of inorganic particles such as a ceramic powder. In particular, when the alkyl-modified vinyl acetal polymer is incorporated into a composition such as paints in slurry form, it can impart a thixotropic nature to the composition. Furthermore, films, sheets, and the like obtained by forming the alkyl-modified vinyl acetal polymer have high strength and flexibility.

Another aspect of the present invention relates to a composition comprising the alkyl-modified vinyl acetal polymer. Since the composition comprises the alkyl-modified vinyl acetal polymer having both toughness and flexibility, the composition can be suitably used for producing films, sheets, etc.

It is preferred that the composition of the aspect of the present invention further comprises a ceramic powder and an organic solvent and is used as a slurry composition for a ceramic green sheet. When the composition of the aspect of the present invention comprises the alkyl-modified vinyl acetal polymer, superior dispersibility of inorganic particles such as a ceramic powder is achieved, thereby allowing the ceramic powder to be homogeneously dispersed without inducing aggregation of the ceramic powder, and thus the composition of the present invention can be suitably used as a slurry composition for a ceramic green sheet. In addition, the composition has a highly thixotropic nature, and therefore is also superior in handleability.

Another aspect the present invention relates to a ceramic green sheet obtained using the composition according to the aspect of the present invention. The ceramic green sheet comprises a ceramic powder homogeneously dispersed within the sheet and exhibits strength and flexibility in a well-balanced manner, because the ceramic green sheet is produced by using the composition comprising the alkyl-modified vinyl acetal polymer according to the aspect of the present invention.

Another aspect of the present invention relates to a laminated ceramic capacitor obtained using the ceramic green sheet according to the aspect of the present invention. The ceramic green sheet functions with high performances as a ceramic dielectric, because the ceramic powder is homogeneously dispersed within the sheet. The laminated ceramic capacitor of the aspect of the present invention, which is produced by laminating such a ceramic green sheet, exhibits superior functions and is also highly reliable, as a capacitor.

Another aspect of the present invention relates to a method for producing an alkyl-modified vinyl acetal polymer, comprising:

copolymerizing an unsaturated monomer represented by the following general formula (II) with a vinyl ester monomer to form an alkyl-modified vinyl ester polymer having a viscosity average degree of polymerization P of 150 or greater and 5,000 or less, and a percentage of alkyl modification S with the unsaturated monomer of 0.05 mol % or greater and 5 mol % or less;

saponifying the alkyl-modified vinyl ester polymer to form an alkyl-modified vinyl alcohol polymer having a degree of saponification of 20 mol % or greater and 99.99 mol % or less; and subjecting the alkyl-modified vinyl alcohol polymer to acetalization to form the alkyl-modified vinyl acetal polymer having a degree of acetalization of 1 mol % or greater and 85 mol % or less.

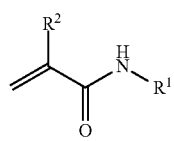

(II)

In the formula, $R^1$ represents a linear or branched alkyl group having 8 to 29 carbon atoms; and $R^2$ represents a hydrogen atom or an alkyl group having 1 to 8 carbon atoms.

According to the method for production of the aspect of the present invention, an alkyl-modified vinyl acetal polymer can be produced that is superior in plasticity and solubility in an alcohol solvent, gives low solution viscosity, also leads to superior stability over time of the solution viscosity, is less likely to cause phase separation from other component when being incorporated into a composition, and exhibits superior dispersibility of inorganic particles such as a ceramic powder. In particular, when the alkyl-modified vinyl acetal polymer is incorporated into a composition such as paints in slurry form, the alkyl-modified vinyl acetal polymer can impart a thixotropic nature to the composition.

Effects of the Invention

The alkyl-modified vinyl acetal polymer according to the aspect of the present invention has a low glass transition point and sufficient plasticity. In addition, the alkyl-modified vinyl acetal polymer has high solubility in an alcohol solvent, gives low solution viscosity, and leads to sufficiently satisfactory stability over time of the solution viscosity. Furthermore, a composition in which the alkyl-modified vinyl acetal polymer is used as various types of binders is less likely to cause phase separation, and exhibits high dispersibility of particles and a thixotropic nature. Furthermore, since the alkyl-modified vinyl acetal polymer according to the aspect of the present invention is internally plasticized, the alkyl-modified vinyl acetal polymer can be thermoplastically formed even in the presence of a reduced amount of a plasticizer used. Therefore, the use of the alkyl-modified vinyl acetal polymer allows for the avoidance of impairment of physical properties and the like caused by addition of a large amount of the plasticizer, and the production of films, sheets and the like that are superior in strength and flexibility is enabled.

DESCRIPTION OF EMBODIMENTS

Alkyl-Modified Vinyl Acetal Polymer

The alkyl-modified vinyl acetal polymer of an embodiment of the present invention is obtained by subjecting an alkyl-modified vinyl alcohol polymer to acetalization. Hereinafter, the alkyl-modified vinyl alcohol polymer will be explained.

Alkyl-Modified Vinyl Alcohol Polymer

The alkyl-modified vinyl alcohol polymer used in the present invention (hereinafter, may be also referred to as "alkyl-modified PVA") comprises a monomer unit represented by the above general formula (I), and has a viscosity average degree of polymerization P of 150 or greater and 5,000 or less, a degree of saponification of 20 mol % or greater and 99.99 mol % or less, and a percentage of alkyl modification S with the monomer unit of 0.05 mol % or greater and 5 mol % or less. When the alkyl-modified PVA comprises the monomer unit represented by the above general formula (I), a thixotropic nature of a slurry composition that comprises the alkyl-modified vinyl acetal polymer is even further improved. Thus, a property of being readily flowable in a high shear rate range and resistant to flow in a low shear rate range can be imparted to the slurry composition, thereby enabling a ratio of a viscosity in the low shear rate range to a viscosity in the high shear rate range to be larger. As a consequence, the coated slurry composition becomes resistant to flow, whereby sheet-attack can be even further inhibited.

The alkyl-modified PVA is not particularly limited as long as it comprises the monomer unit represented by the above general formula (I) and satisfies the characteristics described above.

In the above general formula (I), the number of the carbon atoms included in $R^1$ is necessarily 8 to 29, preferably 10 to 25, more preferably 12 to 24, and still more preferably 18 to 24. When the number of the carbon atoms is less than 8, interaction between the alkyl groups is not exhibited and the internal plasticization effect of the resultant modified vinyl acetal polymer is not exerted, thereby leading to impaired flexibility in the case in which the resultant modified vinyl acetal polymer is formed into and used as a film or a sheet. On the other hand, when the number of the carbon atoms is greater than 29, solubility in water of the alkyl-modified PVA decreases and it becomes difficult to carry out the acetalization reaction described later in an aqueous solution. It is to be noted that $R^1$ may be linear or branched.

In the above general formula (I), $R^2$ represents a hydrogen atom or an alkyl group having 1 to 8 carbon atoms, more preferably a hydrogen atom or a methyl group, and more preferably a methyl group.

The degree of saponification of the alkyl-modified PVA is 20 mol % or greater and 99.99 mol % or less, more preferably 40 mol % or greater and 99.9 mol % or less, still more preferably 77 mol % or greater and 99.9 mol % or less, and particularly preferably 80 mol % or greater and 99.9 mol % or less. When the degree of saponification is less than 20 mol %, solubility in water of the alkyl-modified PVA decreases, and thus preparation of an aqueous solution of the alkyl-modified PVA becomes difficult, leading to difficulty in the production of the alkyl-modified vinyl acetal polymer in an aqueous solution. The degree of saponification exceeding 99.99 mol % leads to loss of practicability, since it leads to difficulty in the production of the alkyl-modified PVA. Herein, the degree of saponification of the alkyl-modified PVA is a value obtained by the measurement in accordance with JIS K6726.

The alkyl-modified PVA has a percentage of alkyl modification S with the monomer unit represented by the above general formula (I) of 0.05 mol % or greater and 5 mol % or less. As used in the present invention, the percentage of alkyl modification S means a molar fraction of the alkyl group with respect to the main chain methylene group of the PVA. The monomer unit constituting the alkyl-modified PVA typically has one main chain methylene group per monomer unit. In other words, the percentage of alkyl modification S of the alkyl-modified PVA is a proportion (mol %) of the number of moles of the unit derived from the monomer represented by the above general formula (I) with respect to the number of moles of all the monomer units constituting the alkyl-modified PVA. When the percentage of alkyl modification S exceeds 5 mol %, the proportion of the hydrophobic group included per molecule of the alkyl-modified PVA is so high that solubility in water of the alkyl-modified PVA decreases, leading to a difficulty in carrying out an acetalization reaction described later in an aqueous solution. The upper limit of the percentage of alkyl modification S is more preferably 2 mol %, and still more preferably 1.5 mol %. On the other hand, when the percentage of alkyl modification S is less than 0.05 mol %, the alkyl-modified PVA has superior solubility in water; however, a small number of the alkyl groups included in the alkyl-modified PVA leads to failure in exhibiting an interaction between the alkyl groups, whereby an internal plasticization effect, which is a physical property imparted by the alkyl-modification, is not sufficiently exhibited in the resultant alkyl-modified vinyl acetal polymer. The lower limit of the percentage of alkyl modification S is more preferably 0.1 mol %.

The percentage of alkyl modification S of the alkyl-modified PVA may be determined by proton NMR of the alkyl-modified PVA. Also, in the case in which the alkyl-modified vinyl ester polymer is saponified to obtain the alkyl-modified PVA, the proportion (mol %) of the number of moles of the unit derived from the monomer represented by the above general formula (I) with respect to the number of moles of all the monomer units per molecule is not altered after the saponification and after the acetalization described later. Therefore, the percentage of alkyl modification S of the alkyl-modified PVA may be determined by proton NMR of the alkyl-modified vinyl ester polymer that is a precursor of the alkyl-modified PVA, or the alkyl-modified vinyl acetal polymer that is an acetalized form of the alkyl-modified PVA.

In the case in which: the alkyl-modified PVA is constituted with only a vinyl alcohol unit, a vinyl ester unit and the unit derived from the monomer represented by the above general formula (I); $R^1$ is linear; and $R^2$ represents a hydrogen atom, the percentage of alkyl modification of the alkyl-modified PVA may be calculated, for example, by making a measurement on the alkyl-modified vinyl ester polymer that is a precursor of the alkyl-modified PVA, in accordance with the following process. First, purification of the modified vinyl ester through reprecipitation in n-hexane/acetone is sufficiently carried out three or more times, and thereafter the modified vinyl ester is dried at 50° C. for 2 days under a reduced pressure, to prepare a sample of the modified vinyl ester for analysis. This sample is dissolved in $CDCl_3$, and subjected to a measurement at room temperature using proton NMR (JEOL GX-500) at 500 MHz. Then, the percentage of alkyl modification S may be calculated in accordance with the following formula from the area of a peak α (4.7 to 5.2 ppm) derived from the main chain, methine, of the vinyl ester, and the area of a peak β (0.8 to 1.0 ppm) derived from the terminal methyl group of the alkyl group $R^1$.

Percentage of alkyl modification $S$(mol %)=[(area of peak β/3)/{area of peak α+(area of peak β/3)}]× 100

The viscosity average degree of polymerization P of the alkyl-modified PVA used in the present invention is determined in accordance with JIS K6726. More specifically, the alkyl-modified PVA is resaponified and purified, and thereafter the viscosity average degree of polymerization P is determined according to the following formula from a limiting viscosity [η] (unit: decilitter/g) as determined in water at 30° C. In the case in which a mixture of two or more types of PVAs are used as the alkyl-modified PVA, an apparent viscosity average degree of polymerization of the overall PVA after mixing is designated as the viscosity average degree of polymerization P for the case. Herein, the viscosity average degree of polymerization may be also merely referred to as "degree of polymerization".

Degree of polymerization $P=([\eta]\times10^3/8.29)^{(1/0.62)}$

The degree of polymerization P of the alkyl-modified PVA used in the present invention is 150 or greater and 5,000 or less. The degree of polymerization P exceeding 5,000 leads to loss of practicability since productivity of the alkyl-modified PVA is reduced. On the other hand, when the degree of polymerization P is less than 150, internal plasticity of the alkyl-modified vinyl acetal polymer obtained using the alkyl-modified PVA becomes too significant, which leads to insufficient strength of a sheet or a film obtained using the same, though the flexibility can be achieved. The lower limit of the degree of polymerization P of the alkyl-modified PVA is preferably 180, more preferably 200, still more preferably 500, particularly preferably 800, and most preferably 1,000. On the other hand, the upper limit of the degree of polymerization of the alkyl-modified PVA is preferably 4,500, and more preferably 3,500.

The alkyl-modified vinyl acetal polymer of the present invention is obtained by subjecting the aforementioned alkyl-modified PVA to acetalization according to a conventionally well-known method. The degree of acetalization in this process is preferably 1 mol % or greater and 85 mol % or less. When the degree of acetalization falls within the above range, an alkyl-modified vinyl acetal polymer having even further superior toughness can be easily obtained. The degree of acetalization of the alkyl-modified vinyl acetal polymer is preferably 10 mol % or greater and 85 mol % or less, more preferably 30 mol % or greater and 85 mol % or less, still more preferably 35 mol % or greater and 85 mol % or less, and particularly preferably 55 mol % or greater and 80 mol % or less. In order to adjust the degree of acetalization of the alkyl-modified vinyl acetal polymer, the amount of the aldehyde added to the alkyl-modified PVA, reaction time after the addition of the aldehyde and an acid catalyst, and the like may be appropriately adjusted.

Herein, the degree of acetalization of the alkyl-modified vinyl acetal polymer as referred to means a proportion of an acetalized vinyl alcohol unit with respect to all the monomer units constituting the alkyl-modified vinyl acetal polymer, and may be calculated from a proton NMR spectrum obtained by carrying out a proton NMR measurement of a solution of the alkyl-modified vinyl acetal polymer in DMSO-$d_6$ (dimethyl sulfoxide) as a sample.

The viscosity average degree of polymerization P of the alkyl-modified vinyl acetal polymer of the present invention is necessarily 150 or greater and 5,000 or less. When the degree of polymerization P of the alkyl-modified vinyl acetal polymer is less than 150, mechanical strength of the resultant sheet or film may become insufficient in the case of producing a sheet or film such as a thin film ceramic green sheet. On the other hand, when the degree of polymerization P of the alkyl-modified vinyl acetal polymer exceeds 5,000, the alkyl-modified vinyl acetal polymer may not be sufficiently dissolved in an organic solvent, or coating property or dispersibility of the resultant solution may be reduced due to too high solution viscosity thereof. The lower limit of the degree of polymerization P of the alkyl-modified vinyl acetal polymer is preferably 200, more preferably 500, still more preferably 800, and particularly preferably 1,000. On the other hand, the upper limit of the degree of polymerization P of the alkyl-modified vinyl acetal polymer is preferably 4,500, and more preferably 3,500.

It is to be noted that the degree of polymerization P of the alkyl-modified vinyl acetal polymer is determined from the degree of polymerization of the alkyl-modified PVA used in the production of the alkyl-modified vinyl acetal polymer. In other words, since the degree of polymerization of the polymers used is not altered during the acetalization, the degree of polymerization of the alkyl-modified PVA is identical to the degree of polymerization of the alkyl-modified vinyl acetal polymer obtained by subjecting the same to acetalization.

The percentage of alkyl modification S of the alkyl-modified vinyl acetal polymer is 0.05 mol % or greater and 5 mol % or less. The percentage of alkyl modification S of the alkyl-modified vinyl acetal polymer as referred to means a proportion (mol %) of the number of moles of the monomer unit represented by the above general formula (I) with respect to the number of moles of all the monomer units constituting the alkyl-modified vinyl acetal polymer. Since the proportion (mol %) of the number of moles of the unit derived from the monomer represented by the above general formula (I) with respect to the number of moles of all the monomer units in the molecule is not altered even after subjecting the alkyl-modified PVA to acetalization, the percentage of alkyl modification S of the alkyl-modified PVA as described above, and is identical to the percentage of alkyl modification S of the alkyl-modified vinyl acetal polymer obtained by subjecting the same to acetalization.

The upper limit of the percentage of alkyl modification S of the alkyl-modified vinyl acetal polymer is preferably 2 mol %, and more preferably 1.5 mol %. On the other hand, when the percentage of alkyl modification S is less than 0.05 mol %, a small number of the alkyl groups included in the alkyl-modified vinyl acetal polymer lead to failure in sufficiently exhibiting physical properties resulting from the alkyl-modification. The lower limit of the percentage of alkyl modification S is preferably 0.1 mol %.

The percentage of alkyl modification S of the alkyl-modified vinyl acetal polymer may be determined from the alkyl-modified vinyl acetal polymer, or from the alkyl-modified PVA or the alkyl-modified vinyl ester polymer, both of which are a precursor thereof. In any case, the percentage of alkyl modification S may be determined by proton NMR. When the percentage of alkyl modification S of the alkyl-modified vinyl acetal polymer is determined from the alkyl-modified vinyl ester polymer, it may be determined in accordance with the method mentioned above as a method for determining the percentage of alkyl modification S of the alkyl-modified PVA.

The percentage content of the vinyl ester monomer unit in the alkyl-modified vinyl acetal polymer of the present invention is preferably 0.01 mol % or greater and 30 mol % or less. When the percentage content of the vinyl ester monomer unit falls within the above range, a slurry composition for a ceramic green sheet having an appropriate viscosity can be easily obtained, a sheet-attack phenomenon of a ceramic green sheet produced by using the alkyl-modified vinyl acetal polymer may be even further inhibited, and furthermore, handleability and mechanical strength as well as dimension accuracy when being thermally compressed may be even further improved. The lower limit of the percentage content of the vinyl ester monomer unit is more preferably 0.5 mol %. On the other hand, the upper limit of the percentage content of the vinyl ester monomer unit is more preferably 23 mol %, and still more preferably 20 mol %. It is to be noted that the alkyl-modified vinyl acetal polymer in which the percentage content of the vinyl ester monomer unit is 0.01 mol % or greater and 30 mol % or less is obtained by, for example, subjecting the alkyl-modified PVA having a percentage content of the vinyl ester monomer unit of 0.01 mol % or greater and 30 mol % or less to acetalization.

The percentage content of the vinyl alcohol monomer unit in the alkyl-modified vinyl acetal polymer of the present invention is preferably 14 mol % or greater and 70 mol % or less. When the percentage content of the vinyl alcohol monomer unit falls within the above range, a slurry composition for a ceramic green sheet having an appropriate viscosity can be easily obtained, the strength of a ceramic green sheet produced by using the alkyl-modified vinyl acetal polymer may be even further improved, and furthermore, the sheet-attack phenomenon may be even further suppressed.

The alkyl-modified vinyl acetal polymer is obtained by subjecting to acetalization an alkyl-modified PVA that comprises the monomer unit represented by the above general formula (I) and has a viscosity average degree of polymerization P of 150 or greater and 5,000 or less, a degree of saponification of 20 mol % or greater and 99.99 mol % or less, and a percentage of alkyl modification S with the monomer unit of 0.05 mol % or greater and 5 mol % or less, as described above. In addition, any alkyl-modified vinyl acetal polymer that comprises the monomer unit represented by the above general formula (I) and has a viscosity average degree of polymerization P of 150 or greater and 5,000 or less, a degree of acetalization of 1 mol % or greater and 85 mol % or less, and a percentage of alkyl modification S of 0.05 mol % or greater and 5 mol % or less is encompassed within the scope of the present invention, even though the alkyl-modified vinyl acetal polymer is produced by a method for production other than that described above.

Method for Producing Alkyl-Modified Vinyl Acetal Polymer

The alkyl-modified vinyl acetal polymer according to the embodiment of the present invention comprises:

copolymerizing an unsaturated monomer represented by the above general formula (II) with a vinyl ester monomer to form an alkyl-modified vinyl ester polymer (copolymer) having a viscosity average degree of polymerization P of 150 or greater and 5,000 or less and a percentage of alkyl modification S of 0.05 mol % or greater and 5 mol % or less (hereinafter, may be also referred to as step (1));

saponifying the alkyl-modified vinyl ester polymer to form an alkyl-modified PVA having a degree of saponification of 20 mol % or greater and 99.99 mol % or less (hereinafter, may be also referred to as step (2)); and subjecting the alkyl-modified PVA to acetalization to form an alkyl-modified vinyl acetal polymer having a degree of acetalization of 1 mol % or greater and 85 mol % or less (hereinafter, may be also referred to as step (3)).

A specific process for each step will be described below in more detail.

Step (1)

This step is a step of copolymerizing an unsaturated monomer represented by the above general formula (II) with a vinyl ester monomer to form an alkyl-modified vinyl ester polymer having a viscosity average degree of polymerization P of 150 or greater and 5,000 or less, and a percentage of alkyl modification S of 0.05 mol % or greater and 5 mol % or less.

In the above general formula (II), $R^1$ represents a linear or branched alkyl group having 8 to 29 carbon atoms; and $R^2$ represents a hydrogen atom or an alkyl group having 1 to 8 carbon atoms. Definition of $R^1$ and $R^2$ in the above general formula (I) may be applied to $R^1$ and $R^2$ in the above general formula (II).

Specific examples of the unsaturated monomer represented by the above general formula (II) include N-octylacrylamide, N-decylacrylamide, N-dodecylacrylamide, N-octadecylacrylamide, N-hexacosylacrylamide, N-octylmethacrylamide, N-decylmethacrylamide, N-dodecylmethacrylamide, N-octadecylmethacrylamide, N-hexacosylmethacrylamide, and the like. Of these, N-octadecylacrylamide, N-octylmethacrylamide, N-decylmethacrylamide, N-dodecylmethacrylamide, N-octadecylmethacrylamide, N-hexacosylmethacrylamide and the like are preferred, and N-octadecylacrylamide, N-dodecylmethacrylamide and N-octadecylmethacrylamide are more preferred.

The temperature employed in copolymerizing the unsaturated monomer represented by the above general formula (II) with the vinyl ester monomer is preferably 0° C. or higher and 200° C. or lower, and more preferably 30° C. or higher and 140° C. or lower. When the temperature during carrying out the copolymerization is lower than 0° C., a sufficient polymerization rate is not likely to be attained. In addition, when the temperature in carrying out the polymerization is higher than 200° C., a modified PVA having the percentage of alkyl modification specified according to the present invention is not likely to be obtained. As a method for adjusting the temperature employed in carrying out the copolymerization to 0° C. or higher and 200° C. or lower, for example, a method in which the polymerization rate is regulated to make a balance between heat generation resulting from the polymerization and heat radiation from the surface of the reaction vessel, a method of adjusting the temperature by an external jacket using an appropriate heating medium, and the like may be exemplified, wherein the latter method is preferred in light of safety.

A polymerization system employed in copolymerizing the unsaturated monomer represented by the above general formula (II) with the vinyl ester monomer may involve any of batch polymerization, semi-batch polymerization, continuous polymerization and semi-continuous polymerization. As the polymerization method, a well-known arbitrary process such as a bulk polymerization process, a solution polymerization process, a suspension polymerization process or an emulsion polymerization process may be employed. Among these, a bulk polymerization process in which polymerization is carried out in the absence of a solvent, or a solution polymerization process in which polymerization is carried out in an alcohol solvent is suitably employed. In the case in which production of a copolymer having a high degree of polymerization is intended, an emulsion polymerization process is suitably employed. Examples of the alcohol solvent which may be used include methanol, ethanol, n-propanol and the like, but not limited thereto. Also, these solvents may be used as a mixture of two or more types thereof.

As an initiator for use in the copolymerization, a conventionally well-known azo type initiator, peroxide type initiator, redox type initiator or the like may be appropriately selected in accordance with the polymerization method. Examples of the azo type initiator include 2,2'-azobisisobutyronitrile, 2,2'-azobis(2,4-dimethylvaleronitrile), 2,2'-azobis(4-methoxy-2,4-dimethylvaleronitrile) and the like. Examples of the peroxide type initiator include percarbonate compounds such as diisopropyl peroxydicarbonate, di(2-ethylhexyl)peroxydicarbonate and diethoxyethyl peroxydicarbonate; perester compounds such as t-butyl peroxyneodecanate, α-cumyl peroxyneodecanate and t-butyl peroxydecanate; acetyl cyclohexylsulfonyl peroxide; 2,4,4-trimethylpentyl-2-peroxyphenoxyacetate, and the like. Furthermore, the foregoing initiator may be combined with potassium persulfate, ammonium persulfate, hydrogen peroxide or the like to provide an initiator. In addition, as the redox type initiator, a combination of the aforementioned peroxide with a reducing agent such as sodium bisulfite, sodium bicarbonate, tartaric acid, L-ascorbic acid or Rongalite may be exemplified.

In addition, when the copolymerization of the unsaturated monomer represented by the above general formula (II) with the vinyl ester monomer is carried out at a high temperature, coloring, etc., of the PVA may be found resulting from degradation of the vinyl ester monomer. In such a case, an antioxidant such as tartaric acid may be added to the polymerization system for preventing coloring in an amount of about 1 ppm or greater and about 100 ppm or less with respect to the vinyl ester monomer.

Examples of the vinyl ester monomer include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, vinyl benzoate, and the like. Of these, vinyl acetate is most preferred.

In copolymerizing the unsaturated monomer represented by the above general formula (II) with the vinyl ester monomer, other monomer may be copolymerized within the range not leading to impairment the effects of the present invention. Examples of the monomer which may be used include α-olefins such as ethylene, propylene, n-butene, and isobutylene; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, and 2,3-diacetoxy-1-vinyloxypropane; nitriles such as acrylonitrile and methacrylonitrile; halogenated vinyls such as vinyl chloride and vinyl fluoride; halogenated vinylidenes such as vinylidene chloride and vinylidene fluoride; allyl compounds such as allyl acetate, 2,3-diacetoxy-1-allyloxypropane and allyl chloride; vinylsilyl compounds such as vinyltrimethoxysilane; isopropenyl acetate; and the like. These monomers are typically used in a proportion of less than 10 mol % with respect to the vinyl ester monomer.

Furthermore, a monomer that gives an α-olefin unit may be copolymerized as other monomer within a range not leading to impairment of the effects of the present invention. The percentage content of the α-olefin unit is preferably 1 mol % or greater and 20 mol % or less.

Upon the copolymerization of the unsaturated monomer represented by the above general formula (II) with the vinyl ester monomer, for the purpose of adjusting the degree of polymerization of the resultant polymer, and the like, the copolymerization may be carried out in the presence of a chain transfer agent within a range not leading to impairment of the effects of the present invention. Examples of the chain transfer agent include aldehydes such as acetaldehyde and propionaldehyde; ketones such as acetone and methyl ethyl ketone; mercaptans such as 2-hydroxyethanethiol; halogenated hydrocarbons such as trichloroethylene and perchloroethylene; phosphinic acid salts such as sodium phosphinate monohydrate; and the like. Of these, aldehydes and ketones are suitably used. The amount of the chain transfer agent added may be decided in accordance with a chain transfer constant of the chain transfer agent added, and the degree of polymerization of the intended vinyl ester polymer, and is preferably 0.1% by mass or greater to 10% by mass or less with respect to the vinyl ester monomer, in general.

Step (2)

This step is a step of saponifying the alkyl-modified vinyl ester polymer to form an alkyl-modified PVA having a degree of saponification of 20 mol % or greater and 99.99 mol % or less.

As a saponification reaction of the alkyl-modified vinyl ester polymer obtained, an alcoholysis reaction or hydrolysis reaction may be employed in which a conventionally well-known basic catalyst such as sodium hydroxide, potassium hydroxide or sodium methoxide, or an acidic catalyst such as p-toluenesulfonic acid is used. The solvent which may be used in this reaction is exemplified by: alcohols such as methanol and ethanol; esters such as methyl acetate and ethyl acetate; ketones such as acetone and methyl ethyl ketone; aromatic hydrocarbons such as benzene and toluene, and the like. These may be used either alone, or in combination of two or more thereof. In particular, carrying out a saponification reaction using methanol or a mixture solution of methanol and methyl acetate as a solvent, and sodium hydroxide as a catalyst is preferred due to the convenience.

Step (3)

This step is a step of subjecting the alkyl-modified PVA to acetalization to form an alkyl-modified vinyl acetal polymer having a degree of acetalization of 1 mol % or greater and 85 mol % or less.

A procedure for the acetalization in the present invention is generally exemplified by a one-step process and a two-step process, and any of them may be employed.

The two-step process is a procedure in which the saponification of the alkyl-modified vinyl ester polymer and the acetalization of the resultant alkyl-modified PVA are carried out in separate reactors. The two-step process is classified broadly into a precipitation process and a dissolution process. As the precipitation process, a method is preferred in which the acetalization reaction of the alkyl-modified PVA is carried out at a low temperature in a solvent containing water as a principal component using an aqueous solution of the alkyl-modified PVA; and after deposition of the alkyl-modified vinyl acetal polymer, the temperature of the system is elevated to allow an aging reaction (completion of the acetalization reaction and reorientation of the acetalization moieties) to proceed. In the dissolution process, after the acetalization reaction of the alkyl-modified PVA is carried out at a high temperature in an alcohol solvent such as isopropanol, or a mixed solution thereof in combination with water or the like, water or the like is added to the system to precipitate and deposit the alkyl-modified vinyl acetal polymer. On the other hand, in the one-step process, the saponification of the alkyl-modified vinyl ester polymer and the acetalization of the resultant alkyl-modified PVA are carried out in a single vessel.

Of the procedures of the acetalization described above, the precipitation process will be further explained in detail. After a 3% by mass or greater and 15% by mass or less aqueous solution of an alkyl-modified PVA is conditioned to a temperature range of 80° C. or higher and 100° C. or lower, the solution is gradually cooled over a period of time of 10 min or longer and 60 min or shorter. When the temperature is lowered to −10° C. or higher and 40° C. or lower, an aldehyde and an acid catalyst are added, and the acetalization reaction is carried out for 10 min or longer and 300 min or shorter while maintaining the temperature constant. The amount of the aldehyde used in this step with respect to 100 parts by mass of the alkyl-modified PVA is preferably 10 parts by mass or greater and 150 parts by mass or less. Thereafter, an aging step is preferably involved in which the temperature of the reaction solution is elevated to 15° C. or higher and 80° C. or lower over a period of time of 30 min or longer and 200 min or shorter, and the same temperature is maintained for 0 min or longer and 360 min or shorter. Next, the reaction solution is suitably cooled to room temperature, washed with water, neutralized by addition of a neutralizing agent such as an alkali, washed, and dried to obtain an intended alkyl-modified vinyl acetal polymer.

Examples of the aldehyde which may be used for the acetalization reaction include aliphatic aldehydes such as formaldehyde (including paraformaldehyde), acetaldehyde (including paraacetaldehyde), propionaldehyde, butylaldehyde, isobutylaldehyde, 2-ethylbutylaldehyde, valeraldehyde, pivalaldehyde, amylaldehyde, hexylaldehyde, heptylaldehyde, 2-ethylhexylaldehyde, octylaldehyde, nonylaldehyde, decylaldehyde, and dodecyl aldehyde; alicyclic aldehydes such as cyclopentanealdehyde, methylcyclopentanealdehyde, dimethylcyclopentanealdehyde, cyclohexanealdehyde, methylcyclohexanealdehyde, dimethylcyclohexanealdehyde, and cyclohexaneacetaldehyde; cyclic unsaturated aldehydes such as cyclopentenealdehyde and cyclohexenealdehyde; aromatic or unsaturated bond-containing aldehydes such as benzaldehyde, 2-methylbenzaldehyde, 3-methylbenzaldehyde, 4-methylbenzaldehyde, dimethylbenzaldehyde, methoxybenzaldehyde, phenylacetaldehyde, β-phenylpropionaldehyde, cuminaldehyde, naphthylaldehyde, anthraldehyde, cinnamaldehyde, crotonaldehyde, acroleinaldehyde, and 7-octen-1-al; and heterocyclic aldehydes such as furfural and methylfurfural; and the like.

Of these, an aldehyde having 2 to 8 carbon atoms is preferably used. The aldehyde having 2 to 8 carbon atoms is exemplified by acetaldehyde, propionaldehyde, n-butylaldehyde, isobutylaldehyde, 3-methylbutanal, n-hexylaldehyde, 2-ethylbutylaldehyde, octylaldehyde, 2-ethylhexylaldehyde, and the like. These may be used either alone, or in combination of two or more thereof. Of these, an aldehyde having 4 to 6 carbon atoms is preferred, and n-butylaldehyde is particularly preferred.

In addition, an aldehyde that includes as a functional group a hydroxyl group, a carboxyl group, a sulfonic acid group, a phosphoric acid group or the like may be used within a range not leading to impairment of the effects of the present invention. Examples of the aldehyde include hydroxyl group-containing aldehydes such as hydroxyacetaldehyde, hydroxypropionaldehyde, hydroxybutylaldehyde, hydroxypentylaldehyde, salicylaldehyde, p-hydroxybenzaldehyde, m-hydroxybenzaldehyde, and dihydroxybenzaldehyde; acid-containing aldehydes such as glyoxylic acid, 2-formylacetic acid, 3-formylpropionic acid, 5-formylpentanoic acid, 4-formylphenoxyacetic acid, 2-carboxybenzaldehyde, 4-carboxybenzaldehyde, 2,4-dicarboxybenzaldehyde, benzaldehyde-2-sulfonic acid, benzaldehyde-2,4-disulfonic acid, 4-formylphenoxysulfonic acid, 3-formyl-1-propanesulfonic acid, 7-formyl-1-heptanesulfonic acid, 4-formylphenoxyphosphonic acid, and metal salts or ammonium salts thereof; and the like.

Furthermore, an aldehyde that includes as a functional group an amino group, a cyano group, a nitro group or a quaternary ammonium salt may be used within a range not leading to impairment of the effects of the present invention.

Examples of the aldehyde include aminoacetaldehyde, dimethylaminoacetaldehyde, diethylaminoacetaldehyde, aminopropionaldehyde, dime thylaminopropionaldehyde, aminobutylaldehyde, aminopentylaldehyde, aminobenzaldehyde, dimethylaminobenzaldehyde, ethylmethylaminobenzaldehyde, diethylaminobenzaldehyde, pyrrolidylacetaldehyde, piperidylacetaldehyde, pyridylacetaldehyde, cyanoacetaldehyde, α-cyanopropionaldehyde, nitrobenzaldehyde, trimethyl-p-formylphenylammonium iodide, triethyl-p-formylphenylammonium iodide, trimethyl-2-formylethylammoniumiodine, and the like.

Furthermore, an aldehyde that includes a halogen as a functional group may be used within a range not leading to impairment of the effects of the present invention. Examples of the aldehyde include chloroacetaldehyde, bromoacetaldehyde, fluoroacetaldehyde, chloropropionaldehyde, bromopropionaldehyde, fluoropropionaldehyde, chlorobutylaldehyde, bromobutylaldehyde, fluorobutylaldehyde, chloropentylaldehyde, bromopentylaldehyde, fluoropentylaldehyde, chlorobenzaldehyde, dichlorobenzaldehyde, trichlorobenzaldehyde, bromobenzaldehyde, dibromobenzaldehyde, tribromobenzaldehyde, fluorobenzaldehyde, difluorobenzaldehyde, trifluorobenzaldehyde, trichloromethylbenzaldehyde, tribromomethylbenzaldehyde, trifluoromethylbenzaldehyde and alkylacetals thereof, and the like.

Upon the acetalization of the alkyl-modified PVA, a multivalent aldehyde such as glyoxal and glutaraldehyde may be used in addition to the aldehydes described above. However, in the case in which the alkyl-modified PVA is acetalized with the multivalent aldehyde, crosslinked sites and uncrosslinked sites may differ in stress relaxation ability, and thus a warp may occur when the alkyl-modified PVA is formed into a molded article such as a film. Therefore, it is preferred that the aldehyde used includes only a monoaldehyde, and when the multivalent aldehyde group is used, the using amount thereof is preferably less than 0.005 mol %, and more preferably 0.003 mol % or less with respect to the vinyl alcohol unit of the alkyl-modified PVA.

It is to be noted that, upon the acetalization, an alkylacetal of the aldehyde exemplified above may also be used in a similar manner.

The acid catalyst for use in the acetalization is not particularly limited, and any of an organic acid and an inorganic acid may be used. Examples thereof include acetic acid, paratoluenesulfonic acid, nitric acid, sulfuric acid, hydrochloric acid, and the like. Among these, hydrochloric acid, sulfuric acid and nitric acid are preferred, and hydrochloric acid and nitric acid are more preferred.

Composition

Intended usage of the alkyl-modified vinyl acetal polymer according to the embodiment of the present invention is not particularly limited. A composition comprising the alkyl-modified vinyl acetal polymer may be widely used as, in addition to ceramic green sheets and binders for an inner electrode of laminated ceramic capacitors, for example: coating materials such as paints, inks, adhesives, and powder paints; thermally developable photosensitive materials; and the like.

The composition according to the embodiment of the present invention comprises the alkyl-modified vinyl acetal polymer, and preferably comprises an additive such as an antioxidant, an ultraviolet ray absorbing agent, a plasticizer, an adhesiveness improving agent, a heat ray absorbing agent, a colorant, a filler, a flow performance improving agent, a lubricant, a dispersant, an antistatic agent, a deflocculating agent, a wetting agent, and a defoaming agent, and a solvent such as an organic solvent in accordance with the intended usage thereof, within a range not leading to impairment of the effects of the present invention. The additive and solvent may be added during the production of the alkyl-modified vinyl acetal polymer, or may be added after the production and before being supplied to various types of intended usage. Among the aforementioned additives, a plasticizer and a filler are preferred.

The plasticizer is not particularly limited as long as the plasticizer is superior in compatibility with the vinyl acetal polymer. Examples thereof include phthalic acid-based plasticizers such as dioctyl phthalate, benzylbutyl phthalate, dibutyl phthalate, dihexyl phthalate, di(2-ethylhexyl)phthalate (hereinafter, may be abbreviated as DOP), and di(2-ethylbutyl)phthalate; adipic acid-based plasticizers such as dihexyl adipate, and di(2-ethylhexyl)adipate (hereinafter, may be abbreviated to as DOA); glycol-based plasticizers such as ethylene glycol, diethylene glycol, and triethylene glycol; glycol ester-based plasticizers such as triethylene glycol dibutyrate, triethylene glycol di(2-ethylbutyrate), and triethylene glycol di(2-ethylhexanoate); phosphoric acid-based plasticizers such as tricresyl phosphate, tributyl phosphate, and triethyl phosphate; and the like. These may be used either alone, or in combination of two or more thereof.

The filler is preferably a ceramic powder. Examples of the ceramic powder include a powder of alumina, zirconia, aluminum silicate, titanium oxide, zinc oxide, barium titanate, magnesia, sialon, spinemulrite, crystallized glass, silicon carbide, silicon nitride, aluminum nitride, and the like. These ceramic powders may be used alone, or two or more types thereof may be used in combination. A glass frit such as an $MgO$—$SiO_2$—$CaO$ based glass frit, a $B_2O_2$—$SiO_2$ based glass frit, a $PbO$—$B_2O_2$—$SiO_2$ based glass frit, a $CaO$—$SiO_2$—$MgO$—$B_2O_2$ based glass frit or a $PbO$—$SiO_2$—$B_2O_2$—$CaO$ based glass frit may be added to the aforementioned ceramic powders.

The organic solvent is not particularly limited, and examples thereof include ketones such as acetone, methyl ethyl ketone, dipropyl ketone, and diisobutyl ketone; alcohols such as methanol, ethanol, isopropanol, and butanol; aromatic hydrocarbons such as toluene and xylene; esters such as methyl propionate, ethyl propionate, butyl propionate, methyl butanoate, ethyl butanoate, butyl butanoate, methyl pentanoate, ethyl pentanoate, butyl pentanoate, methyl hexanoate, ethyl hexanoate, butyl hexanoate, 2-ethylhexyl acetate, and 2-ethylhexyl butyrate; glycol-based solvents such as methyl cellosolve, ethyl cellosolve, butyl cellosolve, α-terpineol, butyl cellosolve acetate, and butyl carbitol acetate; and terpenes. These organic solvents may be used alone, or two or more types thereof may be used in combination.

The composition is preferably a slurry composition for a ceramic green sheet that comprises the alkyl-modified vinyl acetal polymer, the ceramic powder and an organic solvent. The alkyl-modified vinyl acetal polymer inhibits an excessive increase of the viscosity of a solution thereof, when the alkyl-modified vinyl acetal polymer is dissolved in a mixed solvent containing ethanol and toluene at a ratio of 1:1 or an alcohol such as ethanol, which is generally used in the production step of ceramic green sheets. As a result, the ceramic powder can be homogeneously dispersed in the composition without inducing aggregation of the ceramic powder. Also, the composition is superior in coating properties. In this respect, the slurry composition is particularly useful.

The content of the alkyl-modified vinyl acetal polymer in the composition for use as a slurry composition for a ceramic green sheet is suitably 3% by mass or greater and 30% by mass or less with respect to the total amount of the composition. When the content of the alkyl-modified vinyl acetal polymer falls within the above range, film formability of the resultant ceramic green sheet can be even further improved. The content of the alkyl-modified vinyl acetal polymer is more preferably 3% by mass or greater and 20% by mass or less.

In addition, the composition as a slurry composition for a ceramic green sheet may comprise, as a binder resin, an acrylic polymer or a cellulose polymer in addition to the alkyl-modified vinyl acetal polymer. When the acrylic polymer or the cellulose polymer is comprised as a binder resin, the lower limit of the content of the alkyl-modified vinyl acetal polymer with respect to the entire binder resin is preferably 30% by mass in light of the mechanical strength and thermocompression bonding property of the resultant ceramic green sheet.

The upper limit of the content of the ceramic powder with respect to the total amount of the composition according to the embodiment of the present invention that is used as a slurry composition for a ceramic green sheet is preferably 80% by mass, and the lower limit thereof is preferably 17% by mass. When the content of the ceramic powder falls within the above range, the ceramic green sheet can be easily molded.

The organic solvent comprised in the composition for use as a slurry composition for a ceramic green sheet is exemplified by those mentioned above as the organic solvent used in the composition of the embodiment of the present invention. These organic solvents may be used alone, or two or more types thereof may be used in combination. Among these, a mixed solvent of toluene and ethanol, as well as ethanol, α-terpineol, butyl cellosolve acetate or butyl carbitol acetate is suitable in light of favorable handleability thereof.

The upper limit of the content of the organic solvent with respect to the total amount of the composition for use as a slurry composition for a ceramic green sheet is preferably 80% by mass, and the lower limit thereof is preferably 17% by mass. The content of the organic solvent falling within the above range can impart moderate kneadability to the slurry composition for a ceramic green sheet according to the embodiment of the present invention.

As the plasticizer which may be added to the composition for use as a slurry composition for a ceramic green sheet, DOP, DOA, and triethylene glycol di(2-ethylhexanoate) are suitable in light of their low volatility and ease in retaining flexibility of the sheet. These may be used alone, or may be used in combination of two or more thereof. The amount of the plasticizer used is not particularly limited, but the plasticizer is preferably used in an amount of 0.1% by mass or greater and 10% by mass or less, and more preferably 1% by mass or greater and 8% by mass or less with respect to the total amount of the composition that is used as a slurry composition for a ceramic green sheet.

Preparation Method of Composition

The composition according to the embodiment of the present invention may be prepared by dissolving, dispersing, or the like the alkyl-modified vinyl acetal polymer and an additive such as a plasticizer in a solvent such as an organic solvent. More specifically, for example, a method for preparing the composition according to the embodiment of the present invention that is used as a slurry composition for a ceramic green sheet is exemplified by a method in which a binder resin which at least comprises the alkyl-modified vinyl acetal polymer, a ceramic powder, an organic solvent and various types of additives that is added as required are mixed using a mixer or the like. Examples of the mixer include various types of mixers such as a ball mill, a blender mill, three-roller milling machine, or the like.

Ceramic Green Sheet

Since the composition for use as the above-described slurry composition for a ceramic green sheet exhibits the aforementioned performances, the composition enables the production of a thin film ceramic green sheet having sufficient mechanical strength and flexibility. A ceramic green sheet obtained using the composition of the embodiment of the present invention is one of favorable embodiments of the present invention.

The method for production of the ceramic green sheet is not particularly limited, and the ceramic green sheet may be produced by a conventionally well-known method for production. For example, a method is exemplified in which after subjecting the composition for use as a slurry composition for a ceramic green sheet to a defoaming treatment as required, the composition is coated to give a film-like form onto a releasable support such as a polyethylene terephthalate film, the solvent or the like is distilled by means of heating or the like, and thereafter the resultant ceramic green sheet is peeled from the support; and the like.

Laminated Ceramic Capacitor

A laminated ceramic capacitor which is obtained using the ceramic green sheet according to the embodiment of the present invention is also one of favorable embodiments of the present invention. The laminated ceramic capacitor is obtained preferably using the ceramic green sheet and an electrically conductive paste, and more preferably by laminating the ceramic green sheets having the electrically conductive paste coated thereon.

A method for producing the laminated ceramic capacitor is not particularly limited, and the laminated ceramic capacitor may be produced by a conventionally well-known method for production. Examples thereof include a method in which: a laminate is provided by overlaying a plurality of ceramic green sheets that have an electrically conductive paste, a precursor of an internal electrode, coated by, e.g. screen printing, on the surface thereof and subjecting the overlaid article to thermocompression bonding; a binder component and the like comprised in the laminate is thermally degraded and eliminated (defatting treatment); thereafter, the laminate is baked to form a baked ceramic product; and an external electrode is sintered onto the end face of the baked ceramic product obtained; and the like.

EXAMPLES

Hereinafter, the embodiments of the present invention will be explained in more detail by way of Examples, but the present invention is not in any way limited by Examples.

Method for Production of PVA

Production Example 1

Production of PVA1

Into a 3 L reactor equipped with a stirrer, a reflux condenser, a nitrogen inlet tube, a monomer dripping port and an addition port of the initiator were charged 750 g of vinyl acetate, 250 g of methanol, and 1.1 g of N-octadecylmethacrylamide. Replacement with nitrogen gas in the system was carried out for 30 min by bubbling nitrogen. Also, a monomer solution was prepared as a delay solution by dissolving N-octadecylmethacrylamide in methanol to give a concentration of 5% by mass, and subjected to replacement with nitrogen gas by bubbling of nitrogen gas. An elevation of the temperature of the reaction vessel was started, and 0.25 g of 2,2'-azobisisobutyronitrile (AIBN) was added to initiate the polymerization when an internal temperature of 60° C. was attained. Polymerization was allowed at 60° C. for 3 hours while adding the delay solution dropwise such that the monomer composition (ratio of vinyl acetate to N-octadecylmethacrylamide) was kept constant in the polymerization solution, followed by cooling to stop the polymerization. The total amount of the monomer added until the polymerization was stopped was 4.8 g. The solid content concentration was 29.9% by mass when the polymerization was stopped. Subsequently, unreacted vinyl acetate monomer was eliminated while adding methanol at 30° C. under a reduced pressure at intervals to obtain a methanol solution of an alkyl-modified vinyl acetate polymer (hereinafter, may be abbreviated as alkyl-modified PVAc) having a concentration of 35% by mass. Furthermore, 27.9 g of an alkali solution (10% by mass sodium hydroxide solution in methanol) was added to 771.4 g of methanol solution of alkyl-modified PVAc (containing 200.0 g of the alkyl-modified PVAc in the solution) prepared by adding methanol to the solution obtained above to allow for saponification (the concentration of the alkyl-modified PVAc in the saponification solution: 25% by mass; and the molar ratio of sodium hydroxide to the vinyl acetate unit in the alkyl-modified PVAc: 0.03). Since gelatinous matter was produced about 1 min after the alkali solution was added, the gelatinous matter was ground with a grinder, and left to stand at 40° C. for 1 hour to allow saponification to proceed. Thereafter, 500 g of methyl acetate was added to neutralize remaining alkali. After confirming the completion of neutralization using a phenolphthalein indicator, the mixture was filtered to obtain a white solid. To the white solid was added 2,000 g of methanol, and left to stand at room temperature for 3 hours to permit washing. After this washing operation was repeated three times, white solid obtained by deliquoring through centrifugation was dried by leaving to stand in a dryer at 65° C. for 2 days, whereby alkyl-modified PVA (PVA1) was obtained. PVA1 had a degree of polymerization P of 1,700, a degree of saponification of 98.5 mol %, and a percentage of alkyl modification S of 0.4 mol %. The production conditions are shown in Table 1, and the degree of polymerization P, the degree of saponification and the percentage of alkyl modification S are shown in Table 2.

Production Examples 2 to 20 and 22 to 24

Production of PVAs 2 to 20 and 22 to 24

Various types of alkyl-modified PVA (PVAs 2 to 20, 22 to 24) were produced by a method similar to that of Production Example 1 except that: polymerization conditions such as the amount of vinyl acetate and methanol charged, and the type (type of the groups represented by $R^1$ and $R^2$ in the above formula (II)), the amount of addition and the like of the unsaturated monomer having an alkyl group used in the polymerization; and saponification conditions such as the concentration of the alkyl-modified PVAc, and the molar ratio of sodium hydroxide with respect to the vinyl acetate unit in saponification were changed as shown in Table 1. The production conditions are shown in Table 1, and the degree of polymerization P, the degree of saponification and the percentage of alkyl modification S are shown in Table 2.

Production Example 21

Production of PVA 21

Into a 3 L reaction vessel equipped with a stirrer, a reflux condenser, a nitrogen inlet tube and an addition port of the initiator were charged 750 g of vinyl acetate and 250 g of methanol. Replacement with nitrogen gas in the system was carried out for 30 min by bubbling nitrogen. An elevation of the temperature of the reaction vessel was started, and 0.25 g of 2,2'-azobisisobutyronitrile (AIBN) was added to initiate the polymerization when an internal temperature of 60° C. was attained. After polymerization was allowed at 60° C. for 3 hours, the mixture was cooled to stop the polymerization. The solid content concentration was 31.0% when the polymerization was stopped. Subsequently, unreacted vinyl acetate monomer was eliminated while adding methanol at 30° C. under a reduced pressure at intervals to obtain a methanol solution of unmodified polyvinyl acetate (unmodified PVAc) having a concentration of 35%. Furthermore, 27.9 g of an alkali solution (10% by mass sodium hydroxide solution in methanol) was added to 771.1 g of a methanol solution of unmodified PVAc (containing 200.0 g of unmodified PVAc in the solution) prepared by adding methanol to the solution obtained above to allow for saponification (the concentration of the unmodified PVAc in the saponification solution: 25%; and the molar ratio of sodium hydroxide to the vinyl acetate monomer unit in the unmodified PVAc: 0.03). Since gelatinous matter was produced about 1 min after the alkali solution was added, the gelatinous matter was ground with a grinder, and left to stand at 40° C. for 1 hour to allow saponification to proceed. Thereafter, 500 g of methyl acetate was added to neutralize remaining alkali. After confirming the completion of neutralization using a phenolphthalein indicator, the mixture was filtered to obtain a white solid. To the white solid was added 2,000 g of methanol, and left to stand at room temperature for 3 hours to permit washing. After this washing operation was repeated three times, white solid obtained by deliquoring through centrifugation was dried by leaving to stand in a dryer at 65° C. for 2 days, whereby an unmodified PVA (PVA 21) was obtained. PVA 21 had a degree of polymerization P of 1,700 and a degree of saponification of 98.5 mol %. The production conditions are shown in Table 1, and the degree of polymerization, the degree of saponification and the percentage of alkyl modification are shown in Table 2.

TABLE 1

| | | Charging[1] | | | | | Rate of | Saponification conditions | |
| | | | | | | | | PVAc | |
| | | vinyl acetate (g) | methanol (before polymerization) (g) | unsaturated monomer | | | polymerization (% by mole) | concentration (% by mass) | NaOH molar ratio[2] |
| | PVA | | | $R^1$ | $R^2$ | amount (g) | | | |
| Production Example 1 | PVA1 | 750 | 250 | $C_{18}H_{37}$ | $CH_3$ | 4.8 | 40 | 25 | 0.03 |
| Production Example 2 | PVA2 | 850 | 150 | $C_{18}H_{37}$ | $CH_3$ | 4.9 | 30 | 25 | 0.03 |
| Production Example 3 | PVA3 | 950 | 100 | $C_{18}H_{37}$ | $CH_3$ | 4.9 | 30 | 20 | 0.03 |

TABLE 1-continued

| | | Charging[1] | | | | | Saponification conditions | |
| | | vinyl acetate (g) | methanol (before polymerization) (g) | unsaturated monomer | | | PVAc | |
| | PVA | | | R[1] | R[2] | amount (g) | Rate of polymerization (% by mole) | concentration (% by mass) | NaOH molar ratio[2] |
|---|---|---|---|---|---|---|---|---|---|
| Production Example 4 | PVA4 | 550 | 450 | $C_{18}H_{37}$ | $CH_3$ | 4.2 | 40 | 20 | 0.03 |
| Production Example 5 | PVA5 | 400 | 600 | $C_{18}H_{37}$ | $CH_3$ | 3.4 | 50 | 30 | 0.03 |
| Production Example 6 | PVA6 | 200 | 800 | $C_{18}H_{37}$ | $CH_3$ | 2.1 | 50 | 40 | 0.03 |
| Production Example 7 | PVA7 | 100 | 900 | $C_{18}H_{37}$ | $CH_3$ | 1.1 | 50 | 40 | 0.03 |
| Production Example 8 | PVA8 | 750 | 250 | $C_{18}H_{37}$ | $CH_3$ | 4.8 | 40 | 25 | 0.008 |
| Production Example 9 | PVA9 | 750 | 250 | $C_{18}H_{37}$ | $CH_3$ | 4.8 | 40 | 25 | 0.0075 |
| Production Example 10 | PVA10 | 750 | 250 | $C_{18}H_{37}$ | $CH_3$ | 4.8 | 40 | 25 | 0.006 |
| Production Example 11 | PVA11 | 750 | 250 | $C_{18}H_{37}$ | $CH_3$ | 3.2 | 40 | 25 | 0.0075 |
| Production Example 12 | PVA12 | 750 | 250 | $C_{18}H_{37}$ | $CH_3$ | 1.2 | 40 | 25 | 0.0075 |
| Production Example 13 | PVA13 | 750 | 250 | $C_{18}H_{37}$ | $CH_3$ | 1.2 | 40 | 25 | 0.0078 |
| Production Example 14 | PVA14 | 750 | 250 | $C_{18}H_{37}$ | $CH_3$ | 12 | 40 | 25 | 0.007 |
| Production Example 15 | PVA15 | 750 | 250 | $C_{18}H_{37}$ | $CH_3$ | 19.3 | 40 | 25 | 0.0068 |
| Production Example 16 | PVA16 | 750 | 250 | $C_{26}H_{53}$ | $CH_3$ | 7.1 | 40 | 25 | 0.03 |
| Production Example 17 | PVA17 | 750 | 250 | $C_{12}H_{25}$ | $CH_3$ | 4 | 40 | 25 | 0.03 |
| Production Example 19 | PVA19 | 750 | 250 | $C_5H_{11}$ | $CH_3$ | 2.4 | 40 | 25 | 0.03 |
| Production Example 20 | PVA20 | 750 | 250 | $C_{18}H_{37}$ | $CH_3$ | 3.6 | 40 | 25 | 0.0075 |
| Production Example 21 | PVA21 | 750 | 250 | | | — | 45 | 25 | 0.03 |
| Production Example 22 | PVA22 | 750 | 250 | $C_{18}H_{37}$ | $CH_3$ | 38.6 | 40 | 25 | 0.03 |
| Production Example 23 | PVA23 | 750 | 250 | $C_{18}H_{37}$ | $CH_3$ | 0.05 | 40 | 25 | 0.03 |
| Production Example 24 | PVA24 | 750 | 250 | $C_{18}H_{37}$ | H | 4.8 | 40 | 25 | 0.03 |

[1]In Production Examples 1 to 24, 0.25 g of 2,2'-azobisisobutyronitrile (AIBN) was used as a polymerization initiator.
[2]Molar ratio of sodium hydroxide (NaOH) to vinyl acetate unit in PVAc

TABLE 2

| | | Physical properties of PVA | | | | |
| | type | degree of polymerization P | percentage of alkyl-modification S (% by mole) | degree of saponification (% by mole) | unsaturated monomer | |
| | | | | | R[1] | R[2] |
|---|---|---|---|---|---|---|
| Production Example 1 | PVA1 | 1,700 | 0.4 | 98.5 | $C_{18}H_{37}$ | $CH_3$ |
| Production Example 2 | PVA2 | 2,400 | 0.4 | 98.5 | $C_{18}H_{37}$ | $CH_3$ |
| Production Example 3 | PVA3 | 3,500 | 0.4 | 98.5 | $C_{18}H_{37}$ | $CH_3$ |
| Production Example 4 | PVA4 | 1,000 | 0.4 | 98.5 | $C_{18}H_{37}$ | $CH_3$ |
| Production Example 5 | PVA5 | 500 | 0.4 | 98.5 | $C_{18}H_{37}$ | $CH_3$ |
| Production Example 6 | PVA6 | 200 | 0.4 | 98.5 | $C_{18}H_{37}$ | $CH_3$ |
| Production Example 7 | PVA7 | 100 | 0.4 | 98.5 | $C_{18}H_{37}$ | $CH_3$ |
| Production Example 8 | PVA8 | 1,700 | 0.4 | 92.0 | $C_{18}H_{37}$ | $CH_3$ |

TABLE 2-continued

| | | Physical properties of PVA | | | | |
|---|---|---|---|---|---|---|
| | type | degree of polymerization P | percentage of alkyl-modification S (% by mole) | degree of saponification (% by mole) | unsaturated monomer | |
| | | | | | $R^1$ | $R^2$ |
| Production Example 9 | PVA9 | 1,700 | 0.4 | 88.0 | $C_{18}H_{37}$ | $CH_3$ |
| Production Example 10 | PVA10 | 1,700 | 0.4 | 60.0 | $C_{18}H_{37}$ | $CH_3$ |
| Production Example 11 | PVA11 | 1,700 | 0.2 | 88.0 | $C_{18}H_{37}$ | $CH_3$ |
| Production Example 12 | PVA12 | 1,700 | 0.1 | 88.0 | $C_{18}H_{37}$ | $CH_3$ |
| Production Example 13 | PVA13 | 1,700 | 0.08 | 88.0 | $C_{18}H_{37}$ | $CH_3$ |
| Production Example 14 | PVA14 | 1,700 | 1.2 | 88.0 | $C_{18}H_{37}$ | $CH_3$ |
| Production Example 15 | PVA15 | 1,700 | 2.5 | 88.0 | $C_{18}H_{37}$ | $CH_3$ |
| Production Example 16 | PVA16 | 1,700 | 0.4 | 98.5 | $C_{26}H_{53}$ | $CH_3$ |
| Production Example 17 | PVA17 | 1,700 | 0.4 | 98.5 | $C_{12}H_{25}$ | $CH_3$ |
| Production Example 19 | PVA19 | 1,700 | 0.4 | 98.5 | $C_5H_{11}$ | $CH_3$ |
| Production Example 20 | PVA20 | 1,700 | 0.25 | 88.0 | $C_{18}H_{37}$ | $CH_3$ |
| Production Example 21 | PVA21 | 1,700 | — | 98.5 | — | — |
| Production Example 22 | PVA22 | 1,700 | 5.5 | 98.5 | $C_{18}H_{37}$ | $CH_3$ |
| Production Example 23 | PVA23 | 1,700 | 0.01 | 98.5 | $C_{18}H_{37}$ | $CH_3$ |
| Production Example 24 | PVA24 | 1,700 | 0.4 | 98.5 | $C_{18}H_{37}$ | H |
| — | PVA25 | 1,700 | 4.0 | 98.5 | polyoxyethylene vinyl ether (n = 10) | |
| — | PVA26 | 1,700 | 6.0 | 98.5 | 3,4-diacetoxy-1-butane | |
| — | PVA27 | 1,700 | 13.0 | 86.0 | VeoVa10 | |

Synthesis of Alkyl-Modified Vinyl Acetal Polymer

Example 1

Into a glass vessel equipped with a reflux condenser, a thermometer and an anchor type agitator impeller and having an internal volume of 5 L were added 193 g of the alkyl-modified PVA (PVA1) and 2,900 g of water, and the mixture was stirred at 90° C. or higher for about 2 hours, until complete dissolution was attained. The alkyl-modified PVA solution was cooled to 38° C. with stirring, to this was added 201 g of aqueous hydrochloric acid having a concentration of 35% by mass as an acetalization catalyst and 112 g of n-butylaldehyde, and the solution temperature was lowered to 20° C. or lower, to initiate acetalization of the PVA 1. The same temperature was maintained for 15 min, to deposit an alkyl-modified vinyl butyral polymer. Thereafter, the solution temperature was elevated to 30° C., and the solution was retained at 30° C. for 5 hours and cooled to room temperature. The deposited resin was filtered, and washed ten times with ion exchanged water in ×10 volume of the resin. A 0.3% by mass sodium hydroxide aqueous solution was added for neutralization, and the mixture was kept at 70° C. for 5 hours, and thereafter washing the resin with ion exchanged water in ×10 volume of the resin was repeated ten times, dehydrated, and then dried at 40° C. for 18 hours under a reduced pressure, whereby an alkyl-modified vinyl butyral polymer was obtained. The obtained alkyl-modified vinyl butyral polymer had a degree of butyralization (acetalization) of 70.0 mol %, a proportion of the vinyl acetate unit of 1.1 mol %, and a proportion of the vinyl alcohol unit of 28.5 mol %. Each value of physical properties of the obtained alkyl-modified vinyl butyral polymer was measured in accordance with the following method, and haze, solution viscosity and viscosity stability were evaluated in accordance with the following method. The composition, physical properties and results of evaluations of the alkyl-modified vinyl butyral polymer are shown in Table 3. It is to be noted that the alkyl-modified vinyl butyral polymer and plasticizer used for preparation of a test piece for haze measurement were favorably soluble in a mixed solvent.

Examples 2 to 19 and Comparative Examples 1 to 5

Alkyl-modified vinyl butyral polymers were synthesized by a method similar to that of Example 1 except that the alkyl-modified PVAs as shown in Tables 1 and 2 (PVAs 2 to 24) were used in place of the PVA 1, and measurements and evaluations of the following physical properties were made. The composition, physical properties and results of evaluations of each alkyl-modified vinyl butyral polymer are shown in Table 3. It is to be noted that in each Example, the vinyl butyral polymer and plasticizer used for preparation of a test piece for haze measurement were favorably soluble in a mixed solvent.

Examples 20 to 23

Alkyl-modified vinyl butyral polymers were synthesized by a method similar to that of Example 1 except that the amount of hydrochloric acid as an acetalization catalyst and n-butylaldehyde added were changed so that the degree of butyralization (acetalization) of the obtained alkyl-modified vinyl butyral polymers was set to the respective values shown in Table 3, and measurements and evaluations of the following physical properties were made. The composition, physical properties and results of evaluations of each alkyl-modified vinyl butyral polymer are shown in Table 3. It is to be noted that in each Example, the alkyl-modified vinyl butyral polymer and plasticizer used for preparation of a test piece for haze measurement were favorably soluble in a mixed solvent.

Comparative Example 6

A modified vinyl butyral polymer was synthesized by a method similar to that of Example 1 except that modified PVA 25 having a side chain represented by the following general formula (III) disclosed in Patent Document 1 (Japanese Unexamined Patent Application, Publication No. H06-263521) (the composition is shown in Table 2) was used in place of the PVA 1, and measurements and evaluations of the following physical properties were made. The composition, physical properties and results of evaluations of the modified vinyl butyral polymer are shown in Table 3.

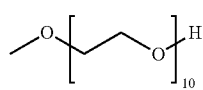

(III)

Comparative Example 7

A modified vinyl butyral polymer was synthesized by a method similar to that of Example 1 except that modified PVA 26 having a monomer unit represented by the following general formula (IV) disclosed in Patent Document 3 (Japanese Unexamined Patent Application, Publication No. 2006-104309) (the composition is shown in Table 2) was used in place of the modified PVA 1, and measurements and evaluations of the following physical properties were made. The composition, physical properties and results of evaluations of the modified vinyl butyral polymer are shown in Table 3.

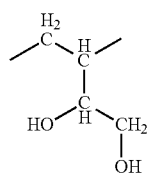

(IV)

Comparative Example 8

A modified vinyl butyral polymer was synthesized by a method similar to that of Example 1 except that modified PVA obtained by copolymerizing VeoVa10 (manufactured by Resolution Performance Products) disclosed in Patent Document (Japanese Unexamined Patent Application (Translation of PCT Application), Publication No. 2008-504415) (the composition is shown in Table 2) was used in place of the PVA 1, and measurements and evaluations of the following physical properties were made. The composition, physical properties and results of evaluations of the modified vinyl butyral polymer are shown in Table 3.

Measurements and Evaluations of Physical Properties of Vinyl Acetal Polymer

Proportion of Vinyl Acetate Unit, Proportion of Vinyl Alcohol Unit and Degree of Acetalization The proportion of vinyl acetate unit, the proportion of vinyl alcohol unit and the degree of acetalization of each vinyl acetal polymer were calculated based on proton-NMR spectra. It is to be noted that the degree of acetalization is a percentage expression of a molar fraction (mol %) calculated by dividing the amount of the ethylene group to which the acetal group binds by the total amount of the ethylene group of the main chain.

Glass Transition Point (Tg)

Determination of the glass transition point of each vinyl acetal polymer was made by using "EXTAR6000 (RD220)" manufactured by Seiko Instruments Inc. Specifically, each vinyl acetal polymer was heated from 30° C. to 150° C. at a rate of temperature rise of 10° C./min under nitrogen, thereafter cooled to 30° C., and heated again to 150° C. at a rate of temperature rise of 10° C./min. The reading obtained during the second temperature rise was defined as a glass transition point (° C.).

Haze

To a mixed solvent composed of 10 parts by mass of toluene and 10 parts by mass of ethanol were added 10 parts by mass of each vinyl acetal polymer and 2 parts by mass of dibutyl phthalate as a plasticizer, and the mixture was stirred and mixed to permit dissolution. The solution was cast on a transparent polyester film ("Ester A-4140" manufactured by Toyobo Co. Ltd.) with a thickness of 50 μm so that the thickness of the residue after drying was 200 μm, and dried at 60 to 80° C. for 4 hours using a hot-air dryer. After being left to stand at 20° C. for 1 day, the film was cut into 25 mm×50 mm pieces to prepare a test piece. Haze (%) was measured for the test piece in accordance with JIS K7105.

Solution Viscosity and Viscosity Stability

Each vinyl acetal polymer was dissolved in ethanol so that a 5% by mass solution was obtained. After confirming complete dissolution, solution viscosity of each solution at 20° C. was measured using a rotational viscometer of Brookfield type. Furthermore, each solution was stored in a hermetically sealed state in a constant temperature room adjusted to 20° C. for 1 month, and the viscosity of each solution after the storage was measured under identical conditions. The initial viscosity and the viscosity after the storage were designated as $\eta_1$ and $\eta_2$, respectively, and a viscosity ratio $\eta_2/\eta_1$ was determined.

Preparation of Slurry Composition for a Ceramic Green Sheet

Slurry compositions for a ceramic green sheet were prepared using each vinyl acetal polymer (vinyl butyral polymer) of Examples 1 to 23 and Comparative Examples 1 to 8. Specifically, 10 parts by mass of each vinyl acetal polymer were added to a mixed solvent composed of 10 parts by mass of toluene and 10 parts by mass of ethanol, and the mixture was stirred and mixed to permit dissolution. To this solution were added 2 parts by mass of dibutyl phthalate as a plasticizer, and the mixture was stirred and mixed. To the obtained solution were added 100 parts by mass of an alumina powder (mean particle size: 1 μm) as a ceramic powder, and the mixture was mixed for 48 hours by means of a ball mill, whereby a slurry composition for a ceramic green sheet comprising a dispersed alumina powder was obtained. The following evaluations were made for each slurry composition obtained. Results of evaluation are shown in Table 4.

Evaluations

Dispersibility

A few drops of each slurry composition thus obtained were taken, and diluted to 80 fold with a mixed solvent containing ethanol and toluene at a ratio of 1:1, whereby a sample for measurement was prepared. A particle size distribution measurement was made for the obtained sample for measurement using a laser particle size analyzer ("LA-910" manufactured by Horiba Ltd.), whereby a mean particle size (μm) was determined. It is to be noted that a mean particle size of 1 μm or less was evaluated to be favorable, whereas a mean particle size of greater than 1 μm accompanied by formation of aggregation of the particles was determined to be unfavorable.

Thixotropic Nature

Preshearing was applied to each slurry composition thus obtained at a shear rate of 500 s$^{-1}$ using a rheometer (manufactured by Rheologica Instruments: a parallel plate with a diameter of 10 mm was used) for 1 min, thereafter measurement of the viscosity was started at a shear rate of 100 s$^{-1}$, and a viscosity ($\eta_1$) 1 min after the start of the measurement was measured. Immediately thereafter, measurement of the viscosity was started at a shear rate of 0.1 s$^{-1}$, and a viscosity ($\eta'_2$) 1 min after the start of the measurement was obtained. The measurement temperature was set to 20° C. A ratio of $\eta'_2$ to $\eta'_1$ thus measured ($\eta'_2/\eta'_1$) was determined, and the determined value was designated as an indicative of the thixotropic nature. It is to be noted that the thixotropic nature was evaluated to be favorable in the case of the indicative of the thixotropic nature being 5.0 or greater, and to be unfavorable in the case of the indicative of the thixotropic nature being less than 5.0.

Preparation of Ceramic Green Sheet

Each slurry composition for a ceramic green sheet obtained thus was coated onto a release-treated polyester film to a thickness of about 50 μm, air-dried at an ordinary temperature for 30 min, and dried in a hot-air dryer at 60 to 80° C. for 1 hour, whereby the organic solvent was evaporated, to obtain a ceramic green sheet with a thickness of 30 μm. The following evaluations were made for each obtained ceramic green sheet. The results of evaluations are shown in Table 4.

Evaluations

Dispersibility in Ceramic Green Sheet

Dispersibility of the ceramic particle in each ceramic green sheet was measured using a grind meter (manufactured by Daiyu Kizai Co., Ltd.; depth of groove: 0 to 25 μm), and evaluation was made in accordance with the following three-level rating system.

A: no aggregation of the ceramic found;

B: no aggregation of the ceramic with a particle size of 5 μm or greater found; and C: aggregation of the ceramic with a particle size of 5 μm or greater found.

Strength of Ceramic Green Sheet

A No. 3 dumbbell test piece in accordance with JIS K6251 was used to measure tensile strength at break (g/cm$^2$) of the ceramic green sheet using a tensile tester ("Autograph", manufactured by Shimadzu Corporation) under measurement conditions involving a measurement temperature of 20° C. and a strain rate of 10 mm/min.

Flexibility of Ceramic Green Sheet

The state of the formation of a crack and a fracture was judged by visual inspection in a state in which each ceramic green sheet was wound around a rod with a 5 mm φ, and evaluation was made in accordance with the following four-level rating system.

A: no crack and fracture found;

B: slightly cracked;

C: slightly fractured; and

D: fractured.

TABLE 3

| | | Polyvinyl acetal polymer | | | | | | |
|---|---|---|---|---|---|---|---|---|
| | type of PVA | degree of acetalization (mol %) | proportion of vinyl acetate unit (mol %) | proportion of vinyl alcohol unit (mol %) | Tg (° c.) | haze (%) | solution viscosity (mPa · s) | viscosity ratio |
| Example 1 | PVA1 | 70.0 | 1.1 | 28.5 | 69 | 0.7 | 45 | 1.11 |
| Example 2 | PVA2 | 70.1 | 1.1 | 28.4 | 69 | 0.8 | 72 | 1.11 |
| Example 3 | PVA3 | 70.0 | 1.2 | 28.4 | 70 | 0.9 | 103 | 1.17 |
| Example 4 | PVA4 | 70.2 | 1.0 | 28.4 | 69 | 0.7 | 23 | 1.22 |
| Example 5 | PVA5 | 69.9 | 1.1 | 28.6 | 69 | 0.8 | 6 | 1.33 |
| Example 6 | PVA6 | 70.0 | 1.1 | 28.5 | 69 | 0.7 | 3 | 1.33 |
| Example 7 | PVA8 | 66.4 | 4.5 | 28.7 | 67 | 0.7 | 38 | 1.11 |
| Example 8 | PVA9 | 63.4 | 8.0 | 28.2 | 66 | 0.8 | 27 | 1.11 |
| Example 9 | PVA10 | 43.0 | 28.0 | 28.6 | 63 | 0.8 | 12 | 1.50 |
| Example 10 | PVA11 | 63.6 | 7.8 | 28.4 | 68 | 0.7 | 35 | 1.23 |
| Example 11 | PVA12 | 63.9 | 7.7 | 28.3 | 69 | 0.6 | 43 | 1.21 |
| Example 12 | PVA13 | 70.3 | 1.0 | 28.6 | 69 | 0.7 | 54 | 1.17 |
| Example 13 | PVA14 | 69.0 | 1.1 | 28.7 | 64 | 0.8 | 21 | 1.29 |
| Example 14 | PVA15 | 67.8 | 1.1 | 28.6 | 61 | 0.7 | 18 | 1.50 |
| Example 15 | PVA16 | 70.0 | 1.1 | 28.5 | 67 | 0.7 | 39 | 1.15 |
| Example 16 | PVA17 | 70.0 | 1.1 | 28.5 | 70 | 0.8 | 56 | 1.13 |
| Example 18 | PVA20 | 63.9 | 7.5 | 28.3 | 67 | 0.7 | 32 | 1.22 |
| Example 19 | PVA24 | 70.0 | 1.1 | 28.5 | 70 | 0.9 | 62 | 1.13 |
| Example 20 | PVA1 | 80.0 | 1.0 | 18.6 | 65 | 0.9 | 38 | 1.13 |
| Example 21 | PVA1 | 85.0 | 1.1 | 13.5 | 64 | 0.8 | 36 | 1.11 |
| Example 22 | PVA1 | 30.0 | 1.2 | 68.4 | 73 | 1.1 | 80 | 1.16 |
| Example 23 | PVA1 | 35.0 | 1.1 | 63.5 | 73 | 1.0 | 76 | 1.18 |
| Comparative Example 1 | PVA7 | 70.0 | 1.2 | 28.4 | 71 | 0.7 | 2 | 2.50 |

TABLE 3-continued

| | | Polyvinyl acetal polymer | | | | | | |
|---|---|---|---|---|---|---|---|---|
| | type of PVA | degree of acetalization (mol %) | proportion of vinyl acetate unit (mol %) | proportion of vinyl alcohol unit (mol %) | Tg (° C.) | haze (%) | solution viscosity (mPa · s) | viscosity ratio |
| Comparative Example 2 | PVA19 | 70.1 | 1.1 | 28.4 | 73 | 1.1 | 70 | 1.14 |
| Comparative Example 3 | PVA21 | 70.4 | 1.1 | 28.5 | 73 | 0.7 | 76 | 1.07 |
| Comparative Example 4 | PVA22 | 65.0 | 1.1 | 28.4 | 63 | 1.1 | 23 | 1.35 |
| Comparative Example 5 | PVA23 | 70.4 | 1.1 | 28.5 | 72 | 1.2 | 72 | 1.08 |
| Comparative Example 6 | PVA25 | 66.7 | 1.1 | 28.2 | 65 | 2.9 | 60 | 1.33 |
| Comparative Example 7 | PVA26 | 64.5 | 1.2 | 28.3 | 66 | 2.9 | 55 | 2.25 |
| Comparative Example 8 | PVA27 | 58.7 | 1.0 | 27.3 | 47 | 2.1 | 64 | 1.16 |

TABLE 4

| | | Slurry composition evaluation | | Green sheet evaluation | | |
|---|---|---|---|---|---|---|
| | Type of PVA | mean particle size (μm) | thixotropic nature $\eta'_2/\eta'_1$ | dispersibility | tensile strength at break (g/cm²) | flexibility |
| Example 1 | PVA1 | 0.53 | 8.8 | A | 29 | A |
| Example 2 | PVA2 | 0.54 | 9.8 | A | 31 | A |
| Example 3 | PVA3 | 0.61 | 10.0 | A | 32 | A |
| Example 4 | PVA4 | 0.52 | 7.2 | A | 25 | A |
| Example 5 | PVA5 | 0.52 | 7.1 | A | 22 | B |
| Example 6 | PVA6 | 0.49 | 5.1 | A | 20 | B |
| Example 7 | PVA8 | 0.52 | 9.0 | A | 28 | A |
| Example 8 | PVA9 | 0.51 | 9.8 | A | 27 | A |
| Example 9 | PVA10 | 0.51 | 6.9 | A | 18 | A |
| Example 10 | PVA11 | 0.52 | 8.8 | A | 28 | A |
| Example 11 | PVA12 | 0.76 | 7.3 | A | 28 | A |
| Example 12 | PVA13 | 0.53 | 6.6 | A | 27 | A |
| Example 13 | PVA14 | 0.81 | 8.5 | A | 28 | A |
| Example 14 | PVA15 | 0.90 | 7.3 | A | 25 | A |
| Example 15 | PVA16 | 0.69 | 7.2 | A | 27 | A |
| Example 16 | PVA17 | 0.72 | 6.4 | A | 23 | A |
| Example 17 | PVA20 | 0.52 | 9.2 | A | 24 | B |
| Example 18 | PVA24 | 0.86 | 8.0 | A | 26 | A |
| Example 19 | PVA1 | 0.60 | 8.2 | A | 25 | A |
| Example 20 | PVA1 | 0.62 | 7.5 | B | 12 | A |
| Example 21 | PVA1 | 0.89 | 6.1 | A | 35 | B |
| Example 22 | PVA1 | 0.68 | 6.3 | B | 37 | B |
| Example 23 | PVA1 | | | | | |
| Comparative Example 1 | PVA7 | 1.10 | 1.2 | C | 6 | C |
| Comparative Example 2 | PVA19 | 1.32 | 1.6 | C | 12 | C |
| Comparative Example 3 | PVA21 | 1.20 | 1.2 | C | 12 | C |
| Comparative Example 4 | PVA22 | 3.62 | 1.3 | B | 6 | D |
| Comparative Example 5 | PVA23 | 1.20 | 1.7 | C | 12 | B |
| Comparative Example 6 | PVA25 | 1.78 | 1.6 | C | 28 | C |
| Comparative Example 7 | PVA26 | 1.00 | 1.6 | B | 10 | C |
| Comparative Example 8 | PVA27 | 5.23 | 1.4 | C | 12 | D |

As shown in Tables 3 and 4, the alkyl-modified vinyl acetal polymers of Examples had a low haze value, superior transparency, a sufficiently low solution viscosity, and superior viscosity stability. In addition, the slurry compositions for a ceramic green sheet prepared by using the alkyl-modified vinyl acetal polymer of Examples were superior in dispersibility of the ceramic particles and thixotropic nature, compared with those of Comparative Examples. Furthermore, the ceramic green sheets obtained using the alkyl-modified vinyl acetal polymers of Examples were superior in dispersibility of the ceramic particles, strength and flexibility, compared with those of Comparative Examples.

Production of Baked Ceramic Product (Laminated Ceramic Capacitor)

One hundred parts by mass of nickel powder ("2020SS" manufactured by Mitsui Mining & Smelting Co., Ltd.) as an electrically conductive powder, 5 parts by mass of ethyl cellulose ("STD-100" manufactured by Dow Chemical Company), and 60 parts by mass of Terpineol-C (manufactured by Nippon Terpene Chemicals, Inc.) as a solvent were mixed, and thereafter the mixture was kneaded with a three-roller milling machine, whereby an electrically conductive paste was obtained. The electrically conductive paste was coated on one side of each ceramic green sheet by a screen printing method and dried, whereby an electrically conductive layer with a thickness of about 1.0 μm was formed. The ceramic green sheet having the electrically conductive layer was cut into square sheets having a side length of 5 cm, and 100 pieces of the square sheets were piled up, heated and thermally compressed at a temperature of 70° C. and a pressure of 150 kg/cm² for 10 min, to obtain a laminate. The obtained laminate was heated to 400° C. at a rate of 3° C./min under a nitrogen atmosphere, kept for 5 hours, thereafter further heated to 1350° C. at a rate of 5° C./min, and kept for 10 hours, whereby a baked ceramic product (laminated ceramic capacitor) was obtained.

When the ceramic green sheets produced by using the alkyl-modified vinyl acetal polymers of Examples were used, production of baked ceramic products (laminated ceramic capacitors) was enabled without any difficulty, and the obtained baked ceramic products worked as a laminated ceramic capacitor without any problems.

INDUSTRIAL APPLICABILITY

The alkyl-modified vinyl acetal polymer according to the embodiment of the present invention has the following characteristics: the alkyl-modified vinyl acetal polymer gives a low solution viscosity and leads to superior stability of viscosity over time and solubility in an alcohol solvent; when being formed into a film or a sheet, the alkyl-modified vinyl acetal polymer achieves high strength and flexibility; and when being incorporated into a resin composition, the alkyl-modified vinyl acetal polymer is less likely to cause phase separation. Therefore, the vinyl acetal polymer according to the embodiment of the present invention may be widely used for intended usages such as coating materials such as paints, inks, adhesives, binders, and powder paints, and thermally developable photosensitive materials, and is particularly suitable for a ceramic green sheet for laminated ceramic capacitors.

The invention claimed is:

1. An alkyl-modified vinyl acetal polymer obtained by subjecting an alkyl-modified vinyl alcohol polymer to acetalization,
wherein:
the alkyl-modified vinyl alcohol polymer comprises a monomer unit represented by formula (I), and
the alkyl-modified vinyl alcohol polymer has: a viscosity average degree of polymerization P of 150 to 5,000; a degree of saponification of 20 mol % to 99.99 mol %; and a percentage of alkyl modification S with the monomer unit of 0.05 mol % to 5 mol %,

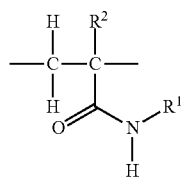

(I)

wherein $R^1$ represents a linear or branched alkyl group having 10 to 29 carbon atoms; and $R^2$ represents a hydrogen atom or an alkyl group having 1 to 8 carbon atoms.

2. The alkyl-modified vinyl acetal polymer of claim 1, having a degree of acetalization of 1 mol % to 85 mol %.

3. A composition comprising the alkyl-modified vinyl acetal polymer of claim 1.

4. The composition of claim 3, further comprising a ceramic powder and an organic solvent.

5. A ceramic green sheet produced from the composition of claim 4.

6. A laminated ceramic capacitor produced from the ceramic green sheet of claim 5.

7. The composition of claim 4, which is suitable for use as a slurry composition for producing a ceramic green sheet.

8. An alkyl-modified vinyl acetal polymer, comprising a monomer unit represented by formula (I), and having: a viscosity average degree of polymerization P of 150 to 5,000; a degree of acetalization of 1 mol % to 85 mol %; and a percentage of alkyl modification S with the monomer unit of 0.05 mol % to 5 mol %,

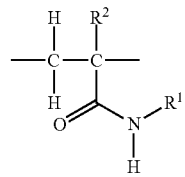

(I)

wherein $R^1$ represents a linear or branched alkyl group having 10 to 29 carbon atoms; and $R^2$ represents a hydrogen atom or an alkyl group having 1 to 8 carbon atoms.

9. A composition comprising the alkyl-modified vinyl acetal polymer of claim 8.

10. The composition of claim 9, further comprising a ceramic powder and an organic solvent.

11. A ceramic green sheet produced from the composition of claim 10.

12. A laminated ceramic capacitor produced from the ceramic green sheet of claim 11.

13. The composition of claim 10, which is suitable for use as a slurry composition for producing a ceramic green sheet.

14. A method for producing an alkyl-modified vinyl acetal polymer, the method comprising:
copolymerizing an unsaturated monomer represented by formula (II) with a vinyl ester monomer to form an alkyl-modified vinyl ester polymer having a viscosity average degree of polymerization P of 150 to 5,000, and a percentage of alkyl modification S with the unsaturated monomer of 0.05 mol % to 5 mol %;
saponifying the alkyl-modified vinyl ester polymer to form an alkyl-modified vinyl alcohol polymer having a degree of saponification of 20 mol % to 99.99 mol %; and
subjecting the alkyl-modified vinyl alcohol polymer to acetalization to form an alkyl-modified vinyl acetal polymer having a degree of acetalization of 1 mol % to 85 mol %,

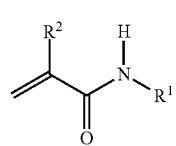

(II)

wherein $R^1$ represents a linear or branched alkyl group having 10 to 29 carbon atoms; and $R^2$ represents a hydrogen atom or an alkyl group having 1 to 8 carbon atoms.

* * * * *